US012682110B2

(12) United States Patent
Oka et al.

(10) Patent No.: US 12,682,110 B2
(45) Date of Patent: Jul. 14, 2026

(54) IMAGE DISPLAY APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventors: Hiroto Oka, Kanagawa (JP); Zhengnan Xia, Kanagawa (JP); Yuuya Miyake, Kanagawa (JP); Naofumi Murata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 18/888,590

(22) Filed: Sep. 18, 2024

(65) Prior Publication Data

US 2025/0111081 A1 Apr. 3, 2025

(30) Foreign Application Priority Data

Sep. 29, 2023 (JP) ................................. 2023-170864

(51) Int. Cl.
*G06F 21/62* (2013.01)
*G06V 40/10* (2022.01)
*H04N 23/63* (2023.01)

(52) U.S. Cl.
CPC .......... *G06F 21/6245* (2013.01); *G06V 40/10* (2022.01); *H04N 23/633* (2023.01)

(58) Field of Classification Search
CPC ... G06F 21/6245; G06V 40/10; H04N 23/633
USPC .............................................. 726/28, 29, 27
See application file for complete search history.

(56) References Cited

U.S. PATENT DOCUMENTS

| | | | | |
|---|---|---|---|---|
| 2013/0136326 A1* | 5/2013 | Iwase | .................... | G16H 40/20 |
| | | | | 382/128 |
| 2014/0368545 A1* | 12/2014 | Ban | ....................... | G01R 33/546 |
| | | | | 345/634 |
| 2016/0248784 A1* | 8/2016 | Kimura | ................. | H04L 63/107 |
| 2017/0000444 A1* | 1/2017 | Inoue | .................... | A61B 6/5205 |
| 2017/0034388 A1* | 2/2017 | Mizuno | ............. | H04N 1/00037 |
| 2019/0303609 A1* | 10/2019 | Riddle | ................ | G06F 21/6245 |
| 2020/0233944 A1* | 7/2020 | Kim | ................... | G06V 40/1335 |
| 2021/0012870 A1* | 1/2021 | Hirakawa | .............. | A61B 6/563 |
| 2021/0306476 A1* | 9/2021 | Inoue | ................. | H04N 1/00474 |
| 2021/0407668 A1* | 12/2021 | Fish | ...................... | H04L 63/101 |

FOREIGN PATENT DOCUMENTS

JP 2004062560 A 2/2004

OTHER PUBLICATIONS

NPL Search Terms (Year: 2025).*
NPL Search Terms (Year: 2026).*

* cited by examiner

*Primary Examiner* — Syed A Zaidi
(74) *Attorney, Agent, or Firm* — Cowan, Liebowitz & Latman, P.C.

(57) ABSTRACT

There is provided an image display apparatus. An acceptance unit accepts authentication information from a user. A selection unit selects an image. A first determination unit determines whether the image includes a specific area of a person. A control unit, in a case where it has been determined that the image includes the specific area, controls display of the image in accordance with the authentication information.

21 Claims, 11 Drawing Sheets

Figure 1A:
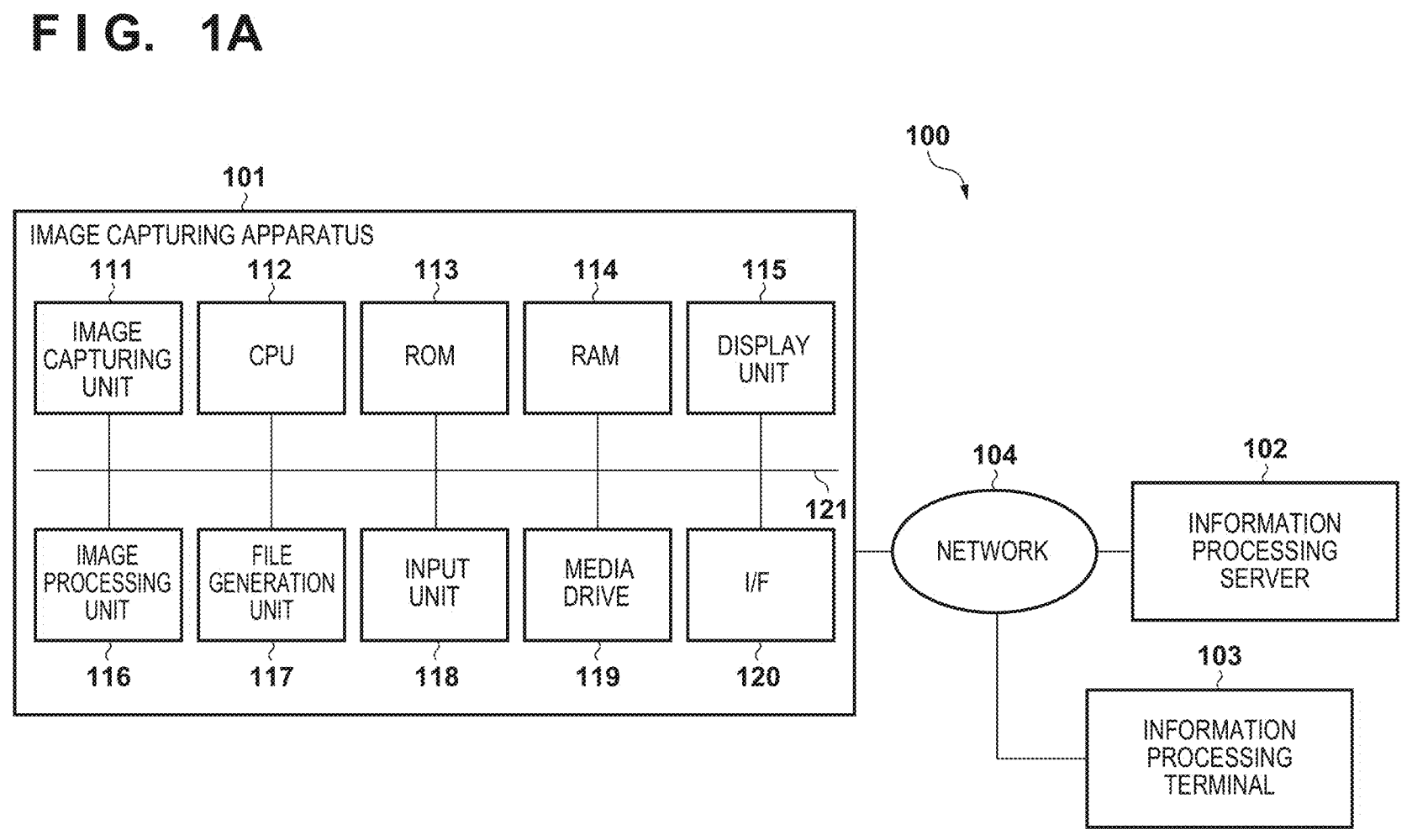

IMAGE CAPTURING APPARATUS — 101

| 111 | 112 | 113 | 114 | 115 |
|---|---|---|---|---|
| IMAGE CAPTURING UNIT | CPU | ROM | RAM | DISPLAY UNIT |

| 116 | 117 | 118 | 119 | 120 |
|---|---|---|---|---|
| IMAGE PROCESSING UNIT | FILE GENERATION UNIT | INPUT UNIT | MEDIA DRIVE | I/F |

121

NETWORK — 104

INFORMATION PROCESSING SERVER — 102

INFORMATION PROCESSING TERMINAL — 103

F I G. 1B
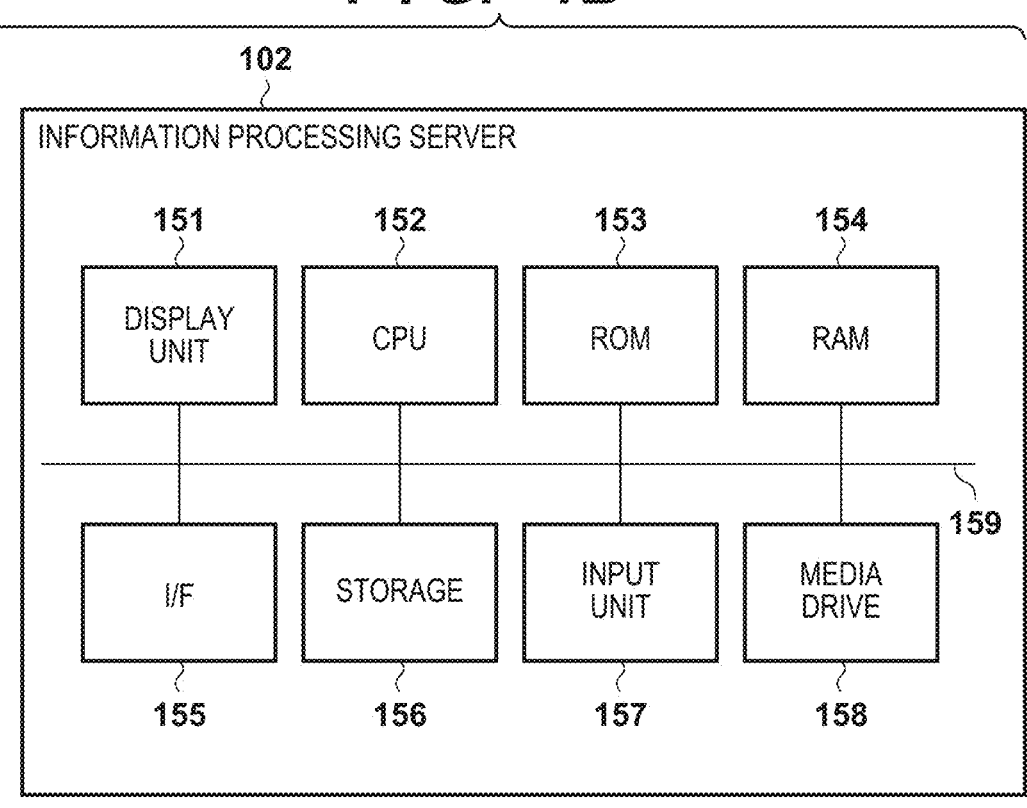

F I G. 2A
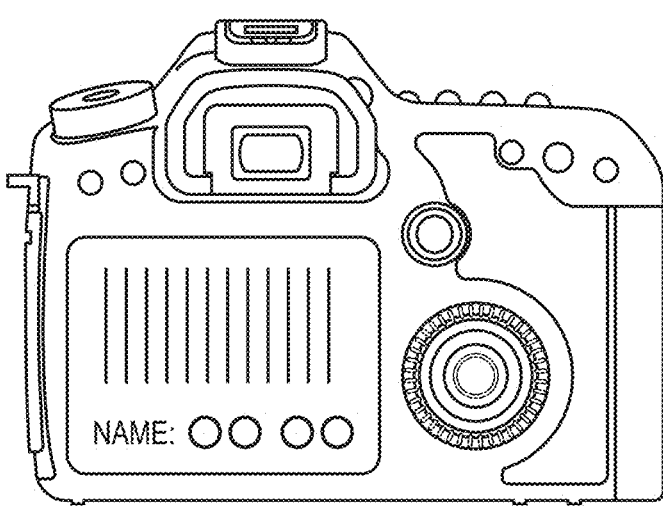
F I G. 2B
201
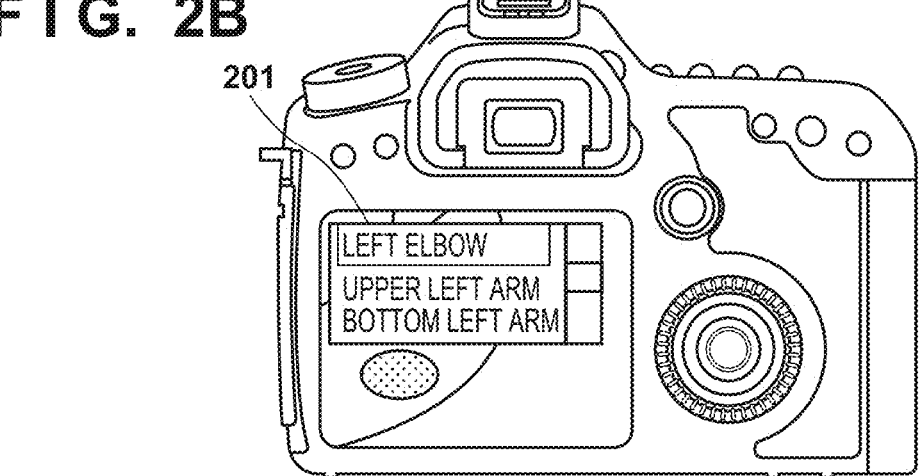
F I G. 2C
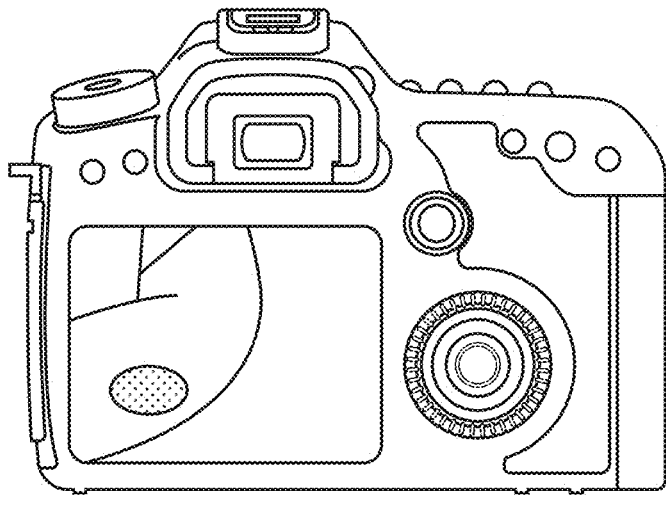

IMAGE CAPTURING APPARATUS

F I G. 3B
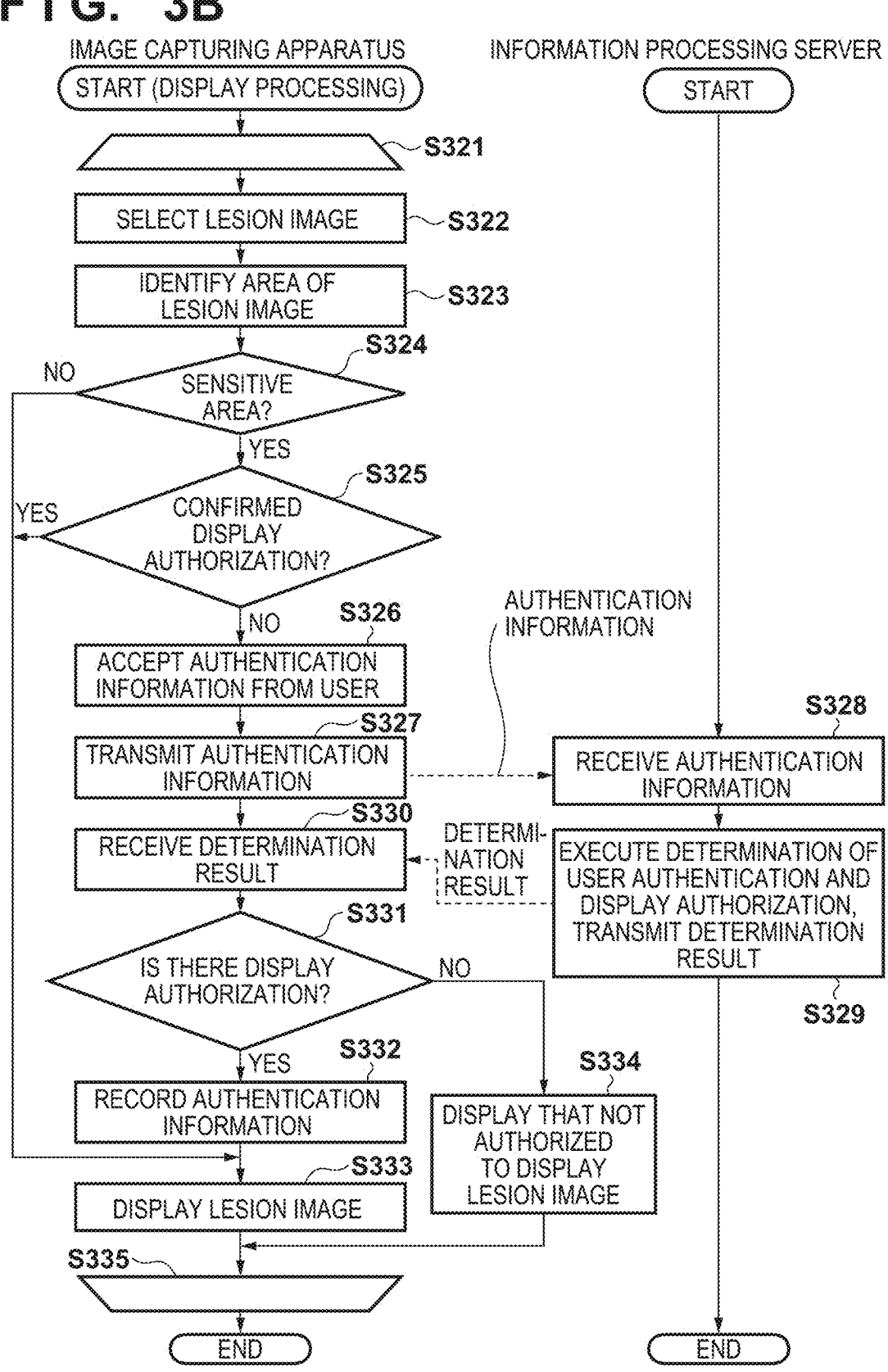

FIG. 6A
ELECTRONIC MEDICAL RECORD SYSTEM LOG IN
USER NAME
PASSWORD
LOG IN
FIG. 6B
PATIENT NAME
OO OO 1988/7/10 35OLD MALE          2023/4/4
MEDICAL
RECORD
2022/6/15
2022/8/7
2022/11/20
2023/2/10
2023/4/4
SYMPTOMS
OOOOOOO
OOOOOOO
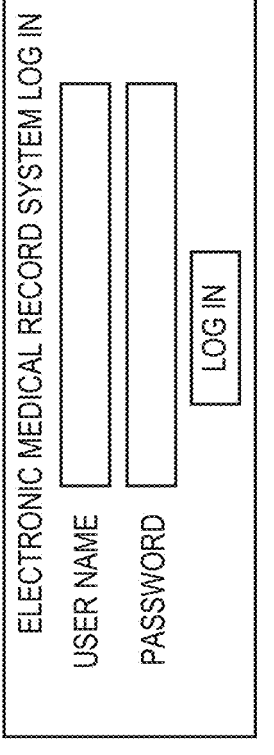
601
602
FINDINGS
OOOOOO
OOOOO
FIG. 6C
PATIENT NAME
OO OO 1988/7/10 35OLD MALE          2023/4/4
MEDICAL
RECORD
2022/6/15
2022/8/7
2022/11/20
2023/2/10
2023/4/4
SYMPTOMS
OOOOOO
OOOOO
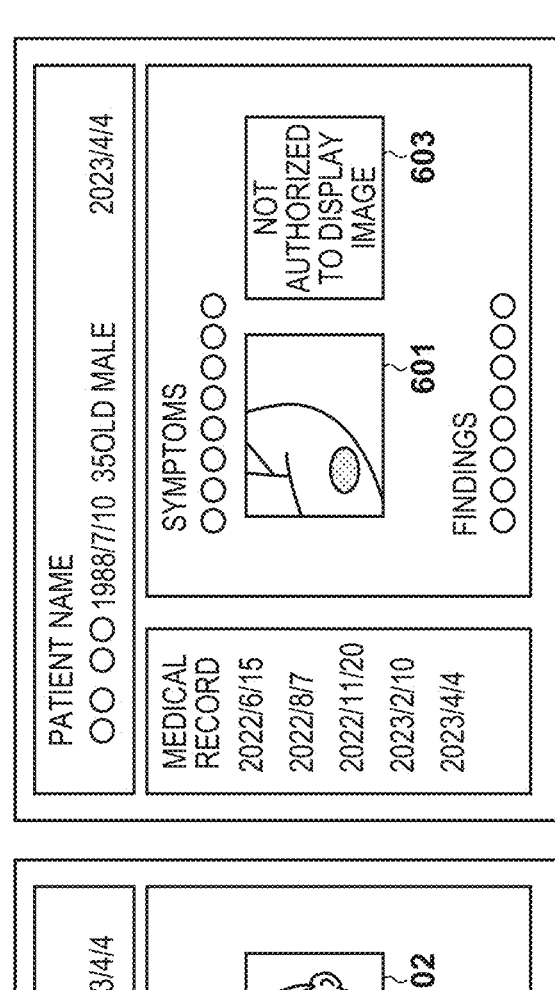
601
NOT
AUTHORIZED
TO DISPLAY
IMAGE
603
FINDINGS
OOOOOO
OOOOO

F I G. 8B

801

| AREA |
|------|
| UPPER ARM |
| LOWER ARM |

F I G. 8A

| AREA | ACCURACY |
|------|----------|
| 801 | 802 |
| UPPER ARM | 0.625 |
| LOWER ARM | 0.219 |
| UPPER LEG | 0.142 |
| ... | ... |
| BUTTOCKS | 0.005 |
| ... | ... |
| FACE | 0.002 |
| ... | ... |

IMAGE DISPLAY APPARATUS, IMAGE CAPTURING APPARATUS, CONTROL METHOD, AND STORAGE MEDIUM

BACKGROUND OF THE INVENTION

Field of the Invention

The present invention relates to an image display apparatus, an image capturing apparatus, a control method, and a storage medium.

Description of the Related Art

A technique is known that detects a face image from an image of a person shot with a camera, and applies occlusion thereto so that a face cannot be recognized (e.g., Japanese Patent Laid-Open No. 2004-62560).

Furthermore, an image capturing apparatus is known that is intended to shoot a lesion of a patient inside a hospital or the like, and record the shot image (lesion image) into an intra-hospital system, such as an image server. After this image capturing apparatus has obtained patient identification information by shooting a barcode wrapped around the wrist of the patient or a barcode handed to the patient at a reception upon arrival in the hospital, the image capturing apparatus shoots the lesion of the patient, associates a lesion image with the patient identification information, and transmits them to the intra-hospital system via wireless or wired communication. The shot lesion image may be stored in the image capturing apparatus as well for the purpose of, for example, providing explanation to the patient. In addition, in a case where the lesion image cannot be transmitted to the intra-hospital system due to a problem in wireless communication or the like, the image capturing apparatus needs to store the lesion image therein and transmit the lesion image to the intra-hospital system upon recovery of wireless communication.

In some cases, a lesion image includes an area that falls under personal information, such as a face of a patient (an area that allows the patient to be identified as a specific individual), or an area concerning the dignity of the patient, such as a genital part. Therefore, although it is necessary in some cases to display the lesion image on the image capturing apparatus or the intra-hospital system for medical purposes, it is not desirable to display the lesion image with no restriction. Furthermore, a similar problem arises not only with regard to a lesion image of a patient, but also in the case of shooting and display of an image that has a possibility of including an area of a person that is desired to be restrained from unnecessary viewing. Japanese Patent Laid-Open No. 2004-62560 does not take such a problem into consideration.

SUMMARY OF THE INVENTION

The present invention has been made in view of the foregoing situation, and provides a technique to suppress the possibility that an image including a specific area of a person will be viewed unnecessarily.

According to a first aspect of the present invention, there is provided an image display apparatus comprising at least one processor and/or at least one circuit which functions as: an acceptance unit configured to accept authentication information from a user; a selection unit configured to select an image; a first determination unit configured to determine whether the image includes a specific area of a person; and a control unit configured to, in a case where it has been determined that the image includes the specific area, control display of the image in accordance with the authentication information.

According to a second aspect of the present invention, there is provided an image capturing apparatus, comprising: the image display apparatus according to the first aspect; and an image sensor configured to generate the image.

According to a third aspect of the present invention, there is provided a control method executed by an image display apparatus, comprising: accepting authentication information from a user; selecting an image; determining whether the image includes a specific area of a person; and in a case where it has been determined that the image includes the specific area, controlling display of the image in accordance with the authentication information.

According to a fourth aspect of the present invention, there is provided a non-transitory computer-readable storage medium which stores a program for causing a computer to execute a control method comprising: accepting authentication information from a user; selecting an image; determining whether the image includes a specific area of a person; and in a case where it has been determined that the image includes the specific area, controlling display of the image in accordance with the authentication information.

Further features of the present invention will become apparent from the following description of exemplary embodiments with reference to the attached drawings.

BRIEF DESCRIPTION OF THE DRAWINGS

FIG. 1A is a diagram showing the configurations of a shooting system 100 and an image capturing apparatus 101.

FIG. 1B is a diagram showing the configurations of an information processing server 102 and an information processing terminal 103.

FIGS. 2A to 2G are diagrams showing examples of screens displayed on a display unit 115 of the image capturing apparatus 101.

FIG. 3B is a flowchart of processing that is executed by the image capturing apparatus 101 and the information processing server 102 when the image capturing apparatus 101 displays a lesion image recorded in an SD card.

FIGS. 6A to 6C are diagrams showing user interfaces (UIs) of an electronic medical record client that operates on the information processing terminal 103.

FIG. 8A is a diagram showing an example of the result of inference of areas made by artificial intelligence with respect to a certain lesion image.

FIG. 8B is a diagram showing an example of a list of areas whose accuracies are equal to or higher than a first threshold among the areas inferred by the artificial intelligence.

DESCRIPTION OF THE EMBODIMENTS

Figure 2D:
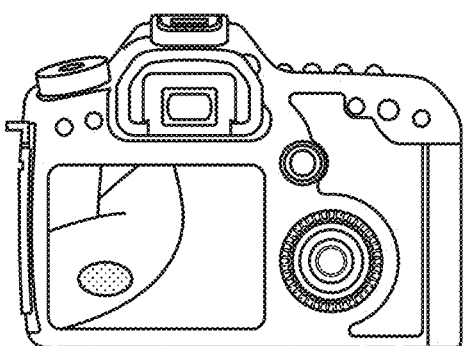

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Each of the following embodiments will be described in relation to a case where a lesion image of a patient is shot and displayed. However, a lesion image of a patient is merely one example of an image that has a possibility of including an area of a person that is desired to be restrained from unnecessary viewing, and each of the following embodiments is not limited to a lesion image of a patient.

First Embodiment

FIG. 1A is a diagram showing the configurations of a shooting system 100 and an image capturing apparatus 101. The shooting system 100 includes the image capturing apparatus 101, an information processing server 102, an information processing terminal 103 that has a role as a client, and a network 104 to which they are connected. In practice, there may be a plurality of image capturing apparatuses 101 and a plurality of information processing terminals 103. Also, the image capturing apparatus 101 and the information processing terminal 103 may be connected to the network 104 via wireless communication.

The configuration of the image capturing apparatus 101 will now be described. 111 is an image capturing unit composed of a lens, an image sensor, and the like. 112 is a CPU that controls the operations of the image capturing apparatus 101. 113 is a ROM in which a control program for the image capturing apparatus 101 is recorded. The control program is executed by the CPU 112. 114 is a RAM into which the CPU 112 or the like records data temporarily. 115 is a display unit provided on a rear surface of the image capturing apparatus 101. 116 is an image processing unit that converts data obtained by the image capturing unit 111 into image data in the form of JPEG or the like. 117 is a file generation unit that generates a file (image file) including image data generated by the image processing unit 116. 118 is an input unit that includes a shutter button, other buttons, dials, a touch panel, and so forth. 119 is a media drive for loading portable media, such as an SD card. 120 is an interface (I/F) intended for the image capturing apparatus 101 to perform communication via the network 104. 121 is a bus that is used when the discrete blocks (reference signs 111 to 120) of the image capturing apparatus 101 communicate with one another.

FIG. 1B is a diagram showing the configurations of the information processing server 102 and the information processing terminal 103. The information processing server 102 has the functions of an electronic medical record server, and can hold electronic medical record information of a patient and a lesion image shot by the image capturing apparatus 101. The information processing terminal 103 has the functions of an electronic medical record client, and can display electronic medical record information and a lesion image obtained from the electronic medical record server. The information processing server 102 and the information processing terminal 103 constitute an electronic medical record system.

First, the configuration of the information processing server 102 will be described. 151 is a display unit, such as a monitor. 152 is a CPU that controls the operations of the information processing server 102. 153 is a ROM in which a control program for the information processing server 102 is recorded. The control program is executed by the CPU 152. 154 is a RAM into which the CPU 152 or the like records data temporarily. 155 is an interface (I/F) intended for the information processing server 102 to perform communication via the network 104. 156 is a storage, such as an HDD and an SSD. 157 is an input unit that includes a keyboard, a mouse, and so forth. 158 is a media drive for loading such media as an SD card and a CD-ROM. 159 is a bus that is used when the discrete blocks (reference signs 151 to 158) of the information processing server 102 communicate with one another.

Next, the configuration of the information processing terminal 103 will be described. 181 is a display unit, such as a monitor. 182 is a CPU that controls the operations of the information processing terminal 103. 183 is a ROM in which a control program for the information processing terminal 103 is recorded. The control program is executed by the CPU 182. 184 is a RAM into which the CPU 182 or the like records data temporarily. 185 is an interface (I/F) intended for the information processing terminal 103 to perform communication via the network 104. 186 is a storage, such as an HDD and an SSD. 187 is an input unit that includes a keyboard, a mouse, and so forth. 188 is a media drive for loading such media as an SD card and a CD-ROM. 189 is a bus that is used when the discrete blocks (reference signs 181 to 188) of the information processing terminal 103 communicate with one another.

FIGS. 2A to 2G are diagrams showing examples of screens displayed on the display unit 115 of the image capturing apparatus 101. FIG. 2A to FIG. 2C show screens that are displayed when the image capturing apparatus 101 shoots a lesion of a patient.

FIG. 2A shows a state where the image capturing apparatus 101 shoots a barcode of the patient using the image capturing unit 111. The barcode of the patient is printed on, for example, the patient's wristband, name tag, registration card, or the like. After shooting the barcode, the image capturing apparatus 101 obtains patient identification information (person identification information) based on a barcode image. For example, the image capturing apparatus 101 obtains a numerical string shown by the barcode as the patient identification information by analyzing the barcode image. As another example, the image capturing apparatus 101 may transmit the barcode image to the information processing server 102. In this case, the information processing server 102 obtains the numerical string shown by the barcode as the patient identification information by analyzing the barcode image, and transmits the obtained patient identification information to the image capturing apparatus 101.

Note that it is permissible to adopt a configuration in which the image capturing apparatus 101 obtains the patient identification information using a method other than shooting the barcode. For example, a patient list may be stored in the ROM 113 of the image capturing apparatus 101, and a photographer may cause the display unit 115 to display the patient list by operating the image capturing apparatus 101 and select the patient identification information from the patient list. As another example, the image capturing apparatus 101 may include a near-field wireless communication unit (not shown), and obtain the patient identification information by reading a near-field wireless communication tag of the patient.

FIG. 2B shows a state where the photographer selects an area to be shot as a lesion. In the example of FIG. 2B, the image capturing apparatus 101 displays an area list 201 on the display unit 115, and causes the photographer to select an area. As another example, the image capturing apparatus 101 displays an area list in a hierarchical structure, and causes the photographer to first select a general area (e.g., "hand") and then select a detailed area (e.g., "left elbow"). This can reduce the trouble that the photographer goes to in searching for an area from the area list. As another example, the image capturing apparatus 101 may display a figure representing a human body on the display unit 115. In this case, the photographer can select an area from the displayed figure. This allows the photographer to intuitively select an area. As another example, the image capturing apparatus 101 may obtain a shooting order from the information processing server 102 before shooting, and obtain an area described in the shooting order.

FIG. 2C shows a state where the image capturing apparatus 101 shoots a lesion of the patient using the image capturing unit 111. After shooting, the image capturing apparatus 101 associates the patient identification information and area information with a lesion image, and transmits them to the information processing server 102. In a case where the transmission has succeeded and the lesion image is not supposed to be left in the image capturing apparatus 101 under a current setting, the image capturing apparatus 101 deletes the lesion image that has been shot. In other cases, the image capturing apparatus 101 stores the lesion image that has been shot into an SD card loaded in the media drive 119.

FIG. 2D to FIG. 2G show screens that are displayed when the image capturing apparatus 101 displays a lesion image stored in the SD card.

FIG. 2D shows a state where the image capturing apparatus 101 displays a lesion on the left elbow of the patient. The left elbow is neither an area that allows an individual to be identified, nor an area concerning the dignity of the patient. Therefore, the image capturing apparatus 101 displays the lesion image without requesting authentication information.

Figure 2E:
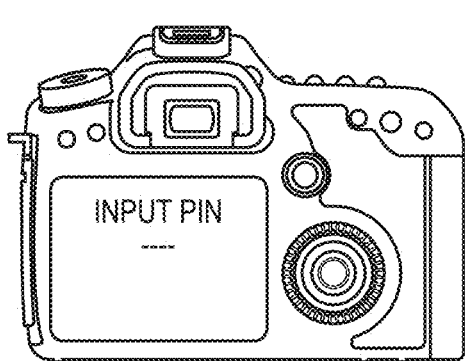
Figure 2F:
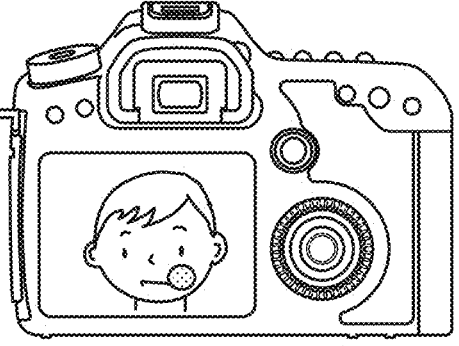
Figure 2G:
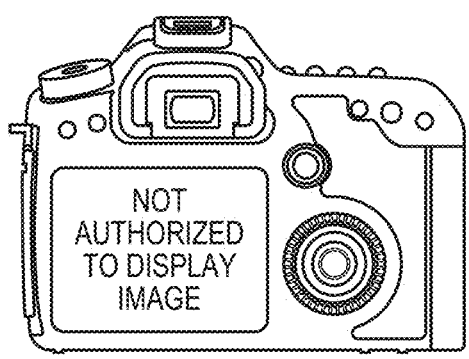

FIG. 2E to FIG. 2G show a case where the image capturing apparatus 101 displays a lesion on the face of the patient. As the face is an area that allows an individual to be identified, the image capturing apparatus 101 displays a screen that requests authentication information, such as a personal identification number (PIN), as shown in FIG. 2E. If the authentication succeeds, the image capturing apparatus 101 displays a lesion image as shown in FIG. 2F. If the authentication fails, the image capturing apparatus 101 presents a display indicating that there is no authorization to display this image as shown in FIG. 2G.

Figure 3A:
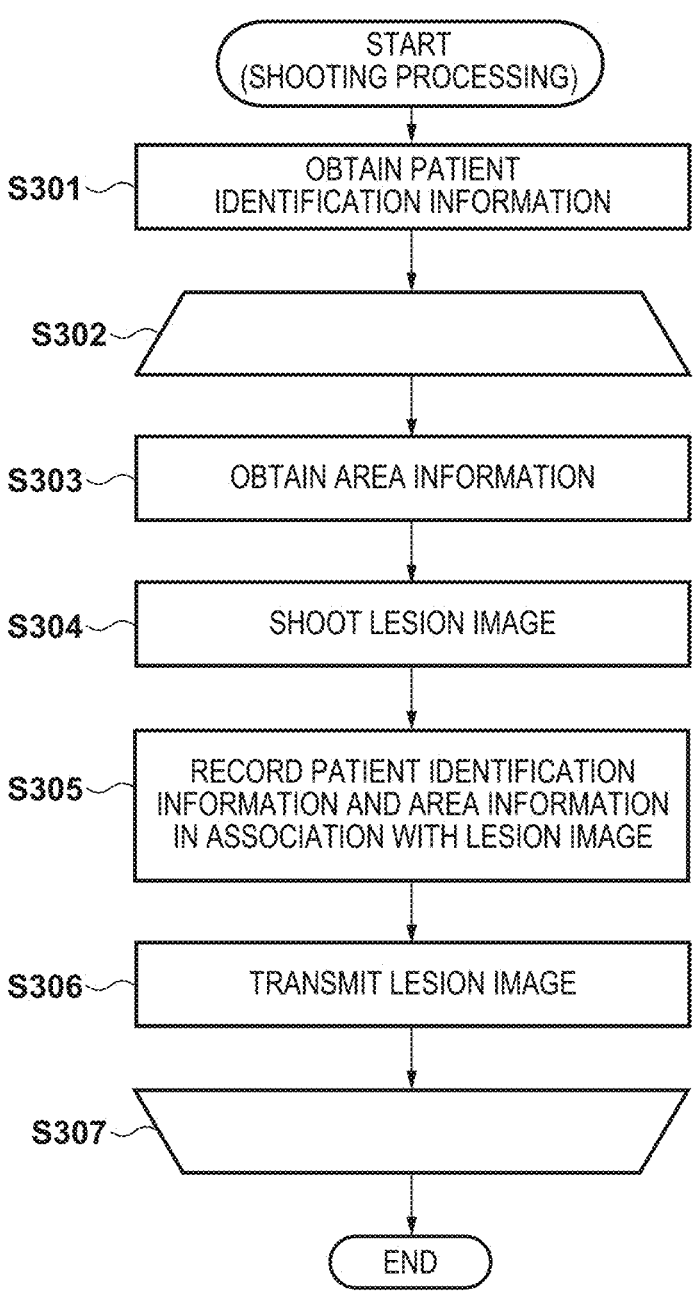
FIG. 3A is a flowchart of processing in which the image capturing apparatus 101 shoots a lesion of a patient.

FIG. 3A is a flowchart of processing in which the image capturing apparatus 101 shoots a lesion of a patient. The processing that is explained to be executed by the image capturing apparatus 101 in the description of the present flowchart can be realized by the CPU 112 executing the program stored in the ROM 113, unless specifically stated otherwise.

In step S301, the image capturing apparatus 101 obtains patient identification information. For example, as has been described with reference to FIG. 2A, the image capturing apparatus 101 can obtain the patient identification information by shooting a barcode of a patient using the image capturing unit 111.

In steps S302 to S307, the image capturing apparatus 101 shoots a lesion of the patient. In general, a plurality of lesion images are shot with respect to one patient; thus, processing of steps S302 to S307 is a loop.

In step S303, the image capturing apparatus 101 obtains information indicating an area to be shot as a lesion (area information). For example, as has been described with reference to FIG. 2B, the image capturing apparatus 101 causes the photographer to select an area, and obtains area information indicating the selected area. Note that in a case where the area information has already been obtained, like when a plurality of images of the same lesion are shot, the image capturing apparatus 101 may skip processing of step S303.

In step S304, the image capturing apparatus 101 shoots the lesion of the patient using the image capturing unit 111, as has been described with reference to FIG. 2C. Shooting of the lesion is performed in response to, for example, depression of the shutter button of the input unit 118 by the photographer.

In step S305, the image capturing apparatus 101 associates a lesion image shot in step S304 with the patient identification information obtained in step S301 and the area information obtained in step S303, and records the lesion image into the SD card loaded in the media drive 119. This association is made by, for example, storing the patient identification information and the area information into a header portion (e.g., Exif) of a lesion image file. As another example, the image capturing apparatus 101 may generate a sidecar file corresponding to the lesion image file, and store the patient identification information and the area information inside the sidecar file. As another example, the image capturing apparatus 101 may generate, inside the SD card, a database for associating the lesion image, the patient identification information, and the area information with one another.

In step S306, the image capturing apparatus 101 transmits the lesion image that was recorded into the SD card in step S305, together with the patient identification information and the area information associated with the lesion image, to the information processing server 102.

In step S307, the image capturing apparatus 101 determines whether the photographer will continue the shooting. In a case where the photographer has issued an instruction for ending the shooting, the image capturing apparatus 101 ends the shooting processing of the present flowchart; otherwise, processing returns to step S302.

FIG. 3B is a flowchart of processing that is executed by the image capturing apparatus 101 and the information processing server 102 when the image capturing apparatus 101 displays a lesion image recorded in the SD card. The processing that is explained to be executed by the image capturing apparatus 101 in the description of the present flowchart can be realized by the CPU 112 executing the program stored in the ROM 113, unless specifically stated otherwise. Furthermore, the processing that is explained to be executed by the information processing server 102 in the description of the present flowchart can be realized by the CPU 152 executing the program stored in the ROM 153, unless specifically stated otherwise.

Note that in FIG. 3B, the image capturing apparatus 101 is used as an example of an image display apparatus that displays a lesion image. However, the image display apparatus of the present embodiment is not limited to the image capturing apparatus 101. For example, the information processing terminal 103 may be used as the image display apparatus. In this case, the information processing terminal 103 acting as the image display apparatus executes processing similar to the processing that is executed by the image capturing apparatus 101 acting as the image display apparatus as described below, as long as this is technically possible.

In steps S321 to S335, the image capturing apparatus 101 executes display processing with respect to a lesion image recorded in the SD card loaded to the media drive 119. In general, a plurality of lesion images are recorded in the SD card; thus, processing of steps S321 to S335 is a loop.

In step S322, the image capturing apparatus 101 selects a lesion image to be displayed. For example, the image capturing apparatus 101 selects a lesion image in response to an instruction for image display, image jump, or the like that has been input by a user using the input unit 118.

In step S323, the image capturing apparatus 101 identifies an area of the lesion image based on area information associated with the lesion image selected in step S322.

In step S324, the image capturing apparatus 101 determines whether the area identified in step S323 is a sensitive area (specific area). In the case of the sensitive area, processing proceeds to step S325; otherwise, processing proceeds to step S333.

The sensitive area is an area for which a restriction on viewing users is desired, such as an area that allows an individual to be identified (an area that allows a patient to be identified as a specific individual), an area concerning the dignity of the patient, and an area that has a high possibility of showing these areas.

The area that allows an individual to be identified is, for example, a face, a palm, the back of a hand, fingertips, an eye (an iris or blood vessels of an eyeball), a row of teeth, an auricle, or the like. Note that it is permissible to determine which area falls under the area that allows an individual to be identified while taking into account an attribute of the patient, such as age. Therefore, the sensitive area may vary in accordance with an attribute of the patient. For example, when the patient is a newborn baby, their face may be treated as an area that does not fall under the area that allows an individual to be identified because it changes in a short period of time. The image capturing apparatus 101 can obtain the attribute of the patient from the intra-hospital system, such as the information processing server 102 (electronic medical record server).

The area concerning the dignity of the patient is, for example, a genital part, a chest, buttocks, or the like. Note that it is permissible to determine which area falls under the area concerning the dignity of the patient while taking into account an attribute of the patient, such as age and sex. Therefore, the sensitive area may vary in accordance with an attribute of the patient. For example, if the patient is male or is an infant or younger, their chest may be treated as an area that does not fall under the area concerning the dignity of the patient.

The area that has a high possibility of showing the area that allows an individual to be identified and the area concerning the dignity of the patient is, for example, a neck, a shoulder, or the like, which is an area that has a high possibility of showing a face.

In step S325, the image capturing apparatus 101 determines whether it has already been confirmed that the user has authorization to display a sensitive area. This processing can be executed as a result of the image capturing apparatus 101 recording authentication information of the user into the RAM 114 in later-described step S332 in a case where it has been determined that the user has the display authorization in later-described step S331. In a case where the display authorization has already been confirmed (i.e., in a case where the authentication information has been stored in the RAM 114), processing proceeds to step S333. In a case where the display authorization has not been confirmed, processing proceeds to step S326. Therefore, in a case where another lesion image (a second lesion image) has been selected after the user has been determined to have authorization to display a sensitive area, the image capturing apparatus 101 refrains from encouraging the user to provide the authentication information. In this way, when another lesion image is displayed after the user has input the authentication information in FIG. 2E and the lesion image has been displayed in FIG. 2F, the hassle of inputting of the authentication information again in FIG. 2E can be saved.

Note that the image capturing apparatus 101 may delete the authentication information of the user from the RAM 114 when one of the following conditions has been satisfied. This can suppress the possibility that another user who does not have the display authorization operates the image capturing apparatus 101 and views a lesion image after it has been confirmed that a specific user has the display authorization.

An operation of turning off the power of the image capturing apparatus 101 has been performed.

An operation mode of the image capturing apparatus 101 has been switched from an image display mode to a shooting mode.

state where the user does not operate the image capturing apparatus 101 has lasted for a predetermined time period.

In step S326, the image capturing apparatus 101 accepts the authentication information from the user. The authentication information to be accepted is, for example, one of the following pieces of information. Furthermore, the image capturing apparatus 101 may accept more than one of the following pieces of information, thereby realizing multifactor authentication.

Knowledge information; for example, a combination of a user name and a password, the PIN that has been described with reference to FIG. 2E, or the like Possession information; for example, a barcode printed on an identification card of the user, magnetic information recorded on the identification card, or the like Biometric information; for example, a fingerprint or an iris of the user, or the like Note that identification information of the user is required depending on the method of making the determination about display authorization (the details will be described in step S329). In this case, an item that includes user identification information is used as the authentication information. For example, in a case where a combination of a user name and a password is used as the authentication information, the user name plays a role as the user identification information. Also, in a case where unique PINs are assigned on a per-user basis, a PIN can be used as identification information that includes the user identification information.

In steps S327 to S331, processing for determining whether the user has authorization to display a sensitive area is executed. The following describes an exemplary configuration in which the image capturing apparatus 101 transmits information necessary for making the determination about display authorization to the information processing server 102 (an external apparatus), receives a determination result from the information processing server 102, and refers to the determination result, thereby determining whether the user has authorization to display a sensitive area. However, the present embodiment is not limited to this configuration. For example, the image capturing apparatus 101 may conclude the processing for making the determination about display authorization inside the image capturing apparatus 101 without communicating with the information processing server 102.

In step S327, the image capturing apparatus 101 transmits the authentication information accepted in step S326 to the information processing server 102 via the I/F 120. Also, in a case where the patient identification information is used to make the determination about display authorization (the details will be described in step S329), the image capturing apparatus 101 transmits the patient identification information that has been associated with the lesion image selected in step S322, in addition to the authentication information, to the information processing server 102. Furthermore, in a case where photographer identification information is used to make the determination about display authorization (the details will be described in step S329), the image capturing apparatus 101 transmits photographer identification information that has been associated with the lesion image selected in step S322, in addition to the authentication information, to the information processing server 102.

Note that in order to associate the photographer identification information with the lesion image, the image capturing apparatus 101 may obtain the photographer identification information, in addition to the patient identification information, in step S301 of FIG. 3A. The photographer identification information can be obtained using a method similar to the method of obtainment of the patient identification information. That is to say, the image capturing apparatus 101 can obtain the photographer identification information by shooting a barcode of the photographer using the image capturing unit 111. In this case, in step S305 of FIG. 3A, the image capturing apparatus 101 can associate not only the patient identification information and the area information, but also the photographer identification information, with the lesion image.

In step S328, the information processing server 102 receives the authentication information that was transmitted by the image capturing apparatus 101 in step S327 (and at least one of the patient identification information and the photographer identification information as necessary).

In step S329, the information processing server 102 performs user authentication based on the received authentication information. Any known authentication method can be used as the authentication method in accordance with the type of the authentication information. Also, the information processing server 102 determines whether the authenticated user has authorization to display a patient image. In order to make the determination about display authorization, the information processing server 102 refers to at least one of the authentication information, patient identification information, and photographer identification information as necessary. The storage 156 of the information processing server 102 stores a database (DB) with which information used to authenticate the user and make the determination about display authorization is registered. Thereafter, the information processing server 102 transmits the result of determination about display authorization to the image capturing apparatus 101. Note that in a case where the aforementioned configuration that concludes the processing for making the determination about display authorization inside the image capturing apparatus 101 is adopted, a database (DB) with which information used to authenticate the user and make the determination about display authorization is registered is stored into the ROM 113 of the image capturing apparatus 101.

Examples of the method of making the determination about display authorization (a determination criterion) include the following.

The information processing server 102 determines that every authenticated user has the display authorization (in other words, in a case where user authentication based on authentication information has succeeded, it is determined that the authenticated user has the display authorization).

In a case where the authenticated user satisfies a specific condition, the information processing server 102 determines that this user has the display authorization.

Examples of the specific condition include the following, for instance.

The authenticated user is attending the patient corresponding to the lesion image to be displayed. In a case where this condition is used, the information processing server 102 makes the determination based on the authentication information and the patient identification information received in step S328.

The authenticated user belongs to the same clinical department or the same treatment group as the photographer of the lesion image to be displayed. In a case where this condition is used, the information processing server 102 makes the determination based on the authentication information and the photographer identification information received in step S328. In this way, for example, in a case where a pressure sore has developed in the patient's buttocks or the like, it is possible to grant only the members of a pressure sore team with the display authorization.

The authenticated user matches the photographer of the lesion image to be displayed. In a case where this condition is used, the information processing server 102 makes the determination based on the authentication information and the photographer identification information received in step S328.

Note that the information that is used to determine whether the display authorization has already been confirmed in step S325 may vary in accordance with a condition used as the specific condition.

For example, when using the condition "the authenticated user attends the patient corresponding to the lesion image to be displayed", the image capturing apparatus 101 stores the patient identification information, in addition to the authentication information of the user, into the RAM 114 in later-described step S332. In this case, after the next lesion image has been selected in step S322, the image capturing apparatus 101 determines whether the patient identification information associated with the next lesion image matches the patient identification information stored in the RAM 114 in step S325. In a case where the patient identification information associated with the next lesion image is different from the patient identification information stored in the RAM 114, the image capturing apparatus 101 determines that the display authorization has not been confirmed, and processing proceeds to step S326. Also, the image capturing apparatus 101 deletes the patient identification information and the authentication information of the user stored in the RAM 114. This can suppress the possibility of the lesion image being viewed by a user who does not have the display authorization.

Furthermore, when using the condition "the authenticated user belongs to the same clinical department or the same treatment group as the photographer of the lesion image to be displayed" or "the authenticated user matches the photographer of the lesion image to be displayed", the image capturing apparatus 101 stores the photographer identification information, in addition to the authentication information of the user, into the RAM 114 in later-described step S332. In this case, after the next lesion image has been selected in step S322, the image capturing apparatus 101 determines whether the photographer identification information associated with the next lesion image matches the photographer identification information stored in the RAM 114 in step S325. In a case where the photographer identification information associated with the next lesion image is different from the photographer identification information stored in the RAM 114, the image capturing apparatus 101 determines that the display authorization has not been confirmed, and processing proceeds to step S326. Also, the image capturing apparatus 101 deletes the photographer identification information and the authentication information of the user stored in the RAM 114. This can suppress the possibility of the lesion image being viewed by a user who does not have the display authorization.

Note that whether the user has the display authorization may be determined using different determination methods (determination criteria) depending on an attribute of the authenticated user. For example, in a case where the authenticated user is a medical doctor, the information processing server 102 determines that this user has the display authorization as long as it has been confirmed that this user is an official staff member of the hospital. On the other hand, in a case where the authenticated user is a nurse, the information processing server 102 determines that this user has the display authorization if this user attends the patient corresponding to the lesion image to be displayed. This enables control to grant a user who is in a high position or has a high level role with authorization to display every image.

In step S330, the image capturing apparatus 101 receives the determination result.

In step S331, the image capturing apparatus 101 determines whether there is display authorization (whether the user has display authorization) based on the determination result received in step S330. In a case where there is display authorization, processing proceeds to step S332; in a case where there is no display authorization, processing proceeds to step S334.

In step S332, the image capturing apparatus 101 records the authentication information of the user into the RAM 114. Also, as has been described in step S329, the image capturing apparatus 101 records the patient identification information and the photographer identification information associated with the lesion image to be displayed, or patient identification information and photographer identification information, into the RAM 114 as necessary.

In step S333, the image capturing apparatus 101 displays the lesion image as shown in, for example, FIG. 2F. Also, in a case where the lesion image does not include a sensitive area, processing proceeds from step S324 to step S333, and the image capturing apparatus 101 displays the lesion image as shown in, for example, FIG. 2D. In this way, in a case where the lesion image does not include a sensitive area, the user can view the lesion image without inputting the authentication information; accordingly, an operational burden on the user is alleviated.

In step S334, the image capturing apparatus 101 presents a display indicating that there is no authorization to display the lesion image as shown in, for example, FIG. 2G.

Step S335 is the end of the loop. If the user ends the image display mode of the image capturing apparatus 101, the image capturing apparatus 101 ends processing of the present flowchart. Otherwise, processing returns to step S321.

Note that even when the lesion image includes a sensitive area, the image capturing apparatus 101 may perform control so that the lesion image is displayed regardless of whether the user has the display authorization in a case where the display size of the lesion image is smaller than a predetermined size. For example, the image capturing apparatus 101 may have a function of displaying a plurality of lesion images as thumbnails at a time, in addition to the above-described function of displaying one lesion image at a time. In a case where a plurality of lesion images are displayed as thumbnails, the display size of each lesion image is relatively small. Therefore, even if the area of the lesion images is a sensitive area, the adverse effect on the patient is considered to be relatively small. For this reason, in the case of thumbnail display, the image capturing apparatus 101 may display the lesion images without requesting the user to input the authentication information.

Furthermore, in the example described above, the image capturing apparatus 101 associates area information with a lesion image at the time of shooting, and determines whether user authentication is necessary (whether confirmation of the display authorization is necessary) using this area information at the time of image display. As another method, the image capturing apparatus 101 may not associate area information with a lesion image at the time of shooting, obtain information indicating a lesion associated with the patient (area information) from the electronic medical record system or the like at the time of image display, and determine whether user authentication is necessary based on the obtained area information. This makes it possible to determine whether a lesion image includes a sensitive area at the time of display without requesting the photographer to select an area. Note that in a case where the patient has a plurality of lesions (i.e., in a case where a plurality of areas are associated with the patient and area information indicates the plurality of areas in the electronic medical record system), the image capturing apparatus 101 may perform control to determine that every lesion image of this patient includes a sensitive area and request user authentication if at least one of the plurality of areas is a sensitive area. This allows the image capturing apparatus 101 to suppress viewing of a sensitive area by a third party, even without specifying which one of the plurality of areas is the area included in each lesion image.

Furthermore, in a case where the image capturing apparatus 101 obtains a shooting order from the information processing server 102 before shooting, the image capturing apparatus 101 may associate the shooting order, instead of the area information, with the lesion image in step S305. As the shooting order describes an area to be shot, the image capturing apparatus 101 can practically associate the area information with the lesion image by associating the shooting order with the lesion image. In this case, the image capturing apparatus 101 obtains the shooting order associated with the lesion image in step S323. Then, the image capturing apparatus 101 determines whether an area of the lesion image is a sensitive area by referring to the area information described in the shooting order in step S324. In a case where the shooting order is used in this way, it is not necessary for the photographer to select an area in step S303; accordingly, an operational burden on the photographer is alleviated.

Moreover, instead of accepting the photographer's selection of an area in step S303, the image capturing apparatus 101 may infer an area shown in the lesion image with use of artificial intelligence (AI) or the like after shooting the lesion image in step S304. In this case, in step S305, the image capturing apparatus 101 may record a list of areas whose accuracies are equal to or higher than a first threshold in association with the lesion image.

FIG. 8A is a diagram showing an example of the result of inference of areas made by the artificial intelligence with respect to a certain lesion image. In FIG. 8A, 801 indicates the areas inferred by the artificial intelligence, and 802 indicates the accuracies of the respective areas obtained through the inference.

FIG. 8B is a diagram showing an example of a list of areas whose accuracies are equal to or higher than the first threshold (0.2 in the example of FIG. 8B) among the areas inferred by the artificial intelligence. In the case of the example of FIG. 8B, the image capturing apparatus 101 records pieces of area information indicating "upper arm" and "lower arm" in association with the lesion image in step S305. Then, the image capturing apparatus 101 obtains the list of areas indicated by the pieces of area information associated with the lesion image in step S323, and determines whether the list of areas includes a sensitive area in step S324. In a case where the list of areas includes a sensitive area, processing proceeds to step S325; otherwise, processing proceeds to step S333. This can suppress viewing of a lesion image that has a high possibility of including a sensitive area by a third party without requesting the photographer to select an area.

Furthermore, at the time of image display, the image capturing apparatus 101 may infer an area shown in the lesion image with use of the artificial intelligence or the like in step S323. In this case, in step S324, the image capturing apparatus 101 determines whether the accuracy of a sensitive area included in the inference result is equal to or higher than a second threshold. In a case where the accuracy of the sensitive area is equal to or higher than the second threshold, processing proceeds to step S325; otherwise, processing proceeds to step S333. For example, in a case where the inference result shown in FIG. 8A has been obtained in step S323, the image capturing apparatus 101 determines whether the accuracies of sensitive areas included in FIG. 8A are equal to or higher than the second threshold (e.g., 0.3) in step S324. In the example of FIG. 8A, only the upper arm is the area with an accuracy equal to or higher than 0.3, and the upper arm is not a sensitive area. Therefore, processing proceeds to step S333, and the image capturing apparatus 101 displays the lesion image without requesting user authentication. This can suppress viewing of a lesion image that has a high possibility of including a sensitive area by a third party without requesting the photographer to select an area. Also, with this configuration, it is not necessary to associate area information with a lesion image at the time of shooting.

Furthermore, in a case where there is no area with an accuracy higher than a third threshold as a result of inferring an area shown in a lesion image with use of the artificial intelligence or the like, the inference may be deemed to have failed. In a case where the inference has failed, the image capturing apparatus 101 may determine that the lesion image includes a sensitive area in step S324, and request user authentication when displaying this lesion image.

As described above, according to the first embodiment, the image capturing apparatus 101 executes processing for accepting authentication information from a user (step S326), and processing for selecting a lesion image (step S322). Furthermore, the image capturing apparatus 101 executes processing for determining whether the selected lesion image includes a sensitive area (specific area) of a patient (step S324). In a case where it has been determined that the selected lesion image includes a sensitive area, the image capturing apparatus 101 controls display of the lesion image in accordance with the authentication information (steps S327, S330, S331, S333, and S334).

Therefore, the present embodiment can suppress the possibility that a lesion image including a sensitive area will be viewed unnecessarily.

Second Embodiment

The first embodiment has been described in relation to a configuration in which the image capturing apparatus 101 causes the photographer to select an area, and obtains area information indicating the selected area. However, in a case where areas are categorized in detail, the photographer needs to select an area from an enormous number of options, which is a burden on the photographer. In view of this, the present embodiment will be described in relation to a configuration in which the image capturing apparatus 101 obtains an area list from the information processing server 102, thereby limiting area options.

In the present embodiment, the basic configuration of the shooting system 100 is similar to that of the first embodiment. The following mainly describes the differences from the first embodiment.

Figure 4:
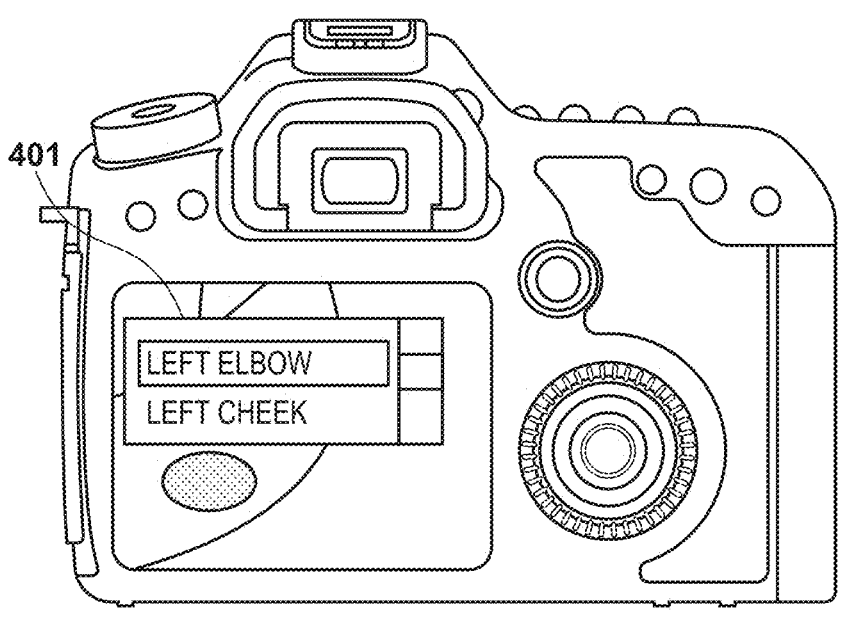
FIG. 4 is a diagram showing a state where a photographer selects an area to be shot as a lesion.

FIG. 4 is a diagram showing a state where the photographer selects an area to be shot as a lesion. In the present embodiment, similarly to the first embodiment, the image capturing apparatus 101 obtains patient identification information by shooting a barcode of a patient, and then transmits the patient identification information to the information processing server 102; consequently, an area list for this patient is obtained. 401 is an area list displayed on the display unit 115. The example of FIG. 4 corresponds to a case where the image capturing apparatus 101 has obtained the area list from the information processing server 102 with respect to a patient whose left elbow and left cheek have lesions. In this example, as the area list 201 includes only two options, the trouble that the photographer goes to in selecting an area is reduced compared to the first embodiment.

Note that in a case where the patient has a lesion only in one site (in a case where the area list includes only one option), the image capturing apparatus 101 need not request the photographer to select an area. In this case, the image capturing apparatus 101 may skip display of the area list 401.

Figure 5:
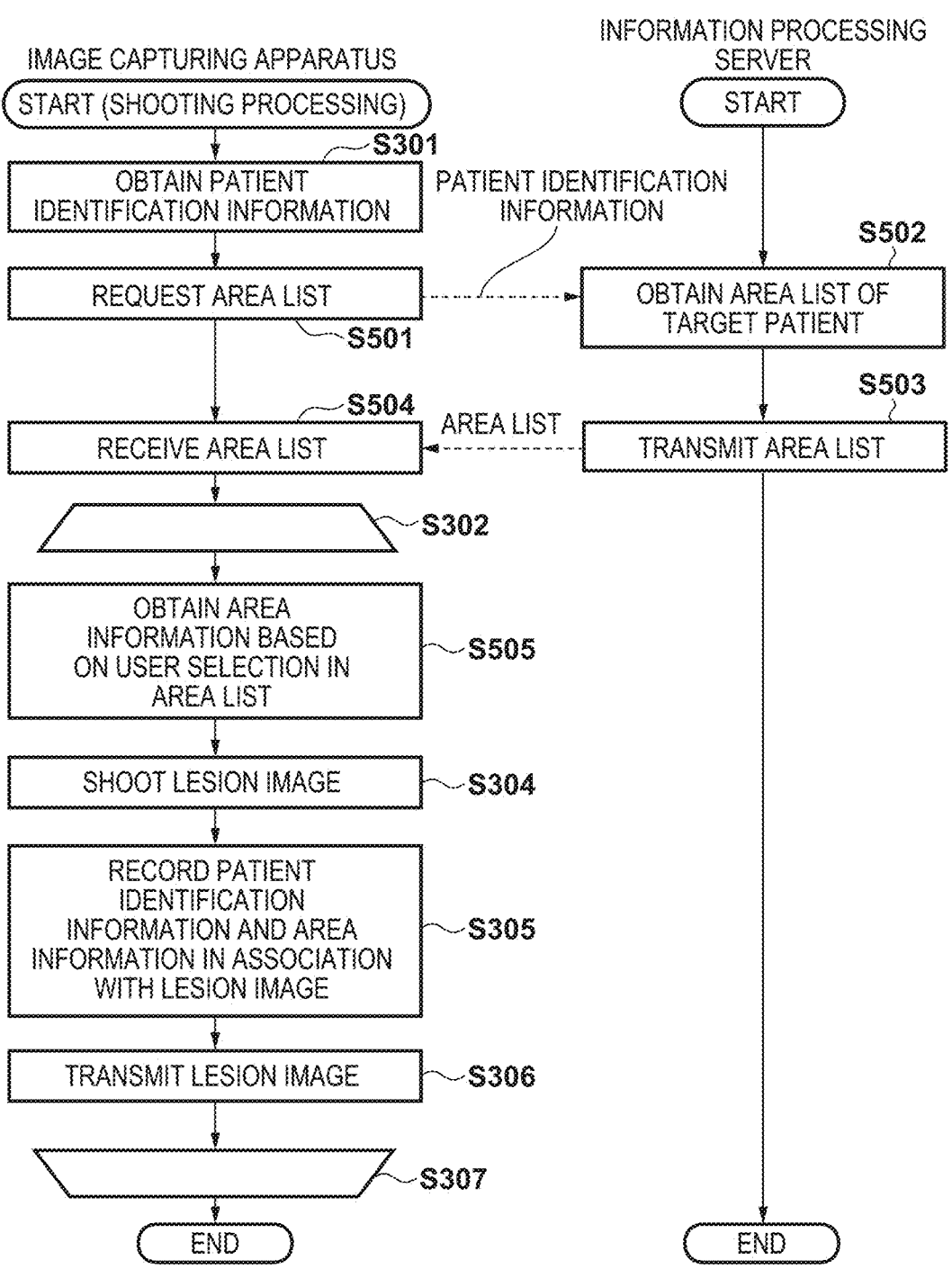
FIG. 5 is a flowchart of processing that is executed by the image capturing apparatus 101 and the information processing server 102 when the image capturing apparatus 101 shoots a lesion of a patient.

FIG. 5 is a flowchart of processing that is executed by the image capturing apparatus 101 and the information processing server 102 when the image capturing apparatus 101 shoots a lesion of a patient. The processing that is explained to be executed by the image capturing apparatus 101 in the description of the present flowchart can be realized by the CPU 112 executing the program stored in the ROM 113, unless specifically stated otherwise. Furthermore, the processing that is explained to be executed by the information processing server 102 in the description of the present flowchart can be realized by the CPU 152 executing the program stored in the ROM 153, unless specifically stated otherwise. The following describes the differences from FIG. 3A.

In step S501, the image capturing apparatus 101 requests an area list by transmitting the patient identification information obtained in step S301 to the information processing server 102.

In step S502, the information processing server 102 obtains a list of areas to be shot as lesions with respect to a patient indicated by the received patient identification information. Examples of the method of obtaining an area list are as follows.

The information processing server 102 has the functions of an electronic medical record server, and obtains an area list of the target patient from the electronic medical record server.

The information processing server 102 obtains pieces of area information associated with lesion images of the target patient among the lesion images that have been shot before and stored in the storage 156 or the media drive 158, and generates an area list based on the obtained pieces of area information.

The information processing server 102 obtains, from a shooting ordering system (not shown) connected to the network 104, a shooting order in which areas of the target patient to be shot have been recorded, and generates an area list based on the obtained shooting order. Note that the information processing server 102 may have the functions of the shooting ordering system.

In step S503, the information processing server 102 transmits the area list obtained in step S502 to the image capturing apparatus 101.

In step S504, the image capturing apparatus 101 receives the area list from the information processing server 102.

In step S505, the image capturing apparatus 101 displays the area list 401 on the display unit 115 as shown in FIG. 4, and obtains area information indicating the area selected by the user.

As described above, according to the second embodiment, an area list of a patient to be shot is obtained from the information processing server 102, and the photographer is caused to select an area from the area list. Therefore, the present embodiment can alleviate a burden on the photographer's operation to select an area.

Third Embodiment

A third embodiment will be described in relation to a case where the information processing terminal 103 that has the functions of an electronic medical record client displays a lesion image registered with the information processing server 102 that has the functions of an electronic medical record server. Note that the electronic medical record server may be a server different from the information processing server 102. In this case, it is sufficient for processing that is explained below to be executed by the information processing server 102 to be executed by the information processing server 102 in coordination with the electronic medical record server as necessary.

In the present embodiment, the basic configuration of the shooting system 100 is similar to that of the first embodiment. The following mainly describes the differences from the first embodiment.

FIGS. 6A to 6C are diagrams showing user interfaces (UIs) of the electronic medical record client that operates on the information processing terminal 103. This electronic medical record client operates in coordination with the electronic medical record server inside the information processing server 102.

FIG. 6A shows a login screen of the electronic medical record client. A user logs into the electronic medical record client by inputting authentication information, such as a user name and a password, on the login screen. Note that the authentication information is not limited to the user name and the password, and various types of information can be used thereas. Examples of the information that can be used as the authentication information are as described in the first embodiment with reference to step S326.

FIG. 6B shows a screen of information of a specific patient that is displayed on the electronic medical record client by a medical doctor who attends this patient. 601 is an image of a lesion on the left elbow of this patient, and 602 is an image of a lesion on the face of this patient.

FIG. 6C shows a screen of information of the same patient as FIG. 6B that is displayed on the electronic medical record client by a medical doctor who does not attend this patient. As the left elbow is neither an area that allows an individual to be identified, nor an area concerning the dignity of the patient, the information processing terminal 103 displays the image 601 of the lesion on the left elbow, similarly to FIG. 6B. However, as the face is an area that allows an individual to be identified, the information processing terminal 103 presents a display indicating that there is no authorization to display the image of the face as indicated by reference sign 603.

Note that various methods can be used as the method of making the determination about display authorization (a determination criterion), similarly to the first embodiment. Examples of the method of making the determination about display authorization (the determination criterion) are as described in the first embodiment with reference to step S329 (note, the criterion where every authenticated user has the display authorization is excluded).

Figure 7:
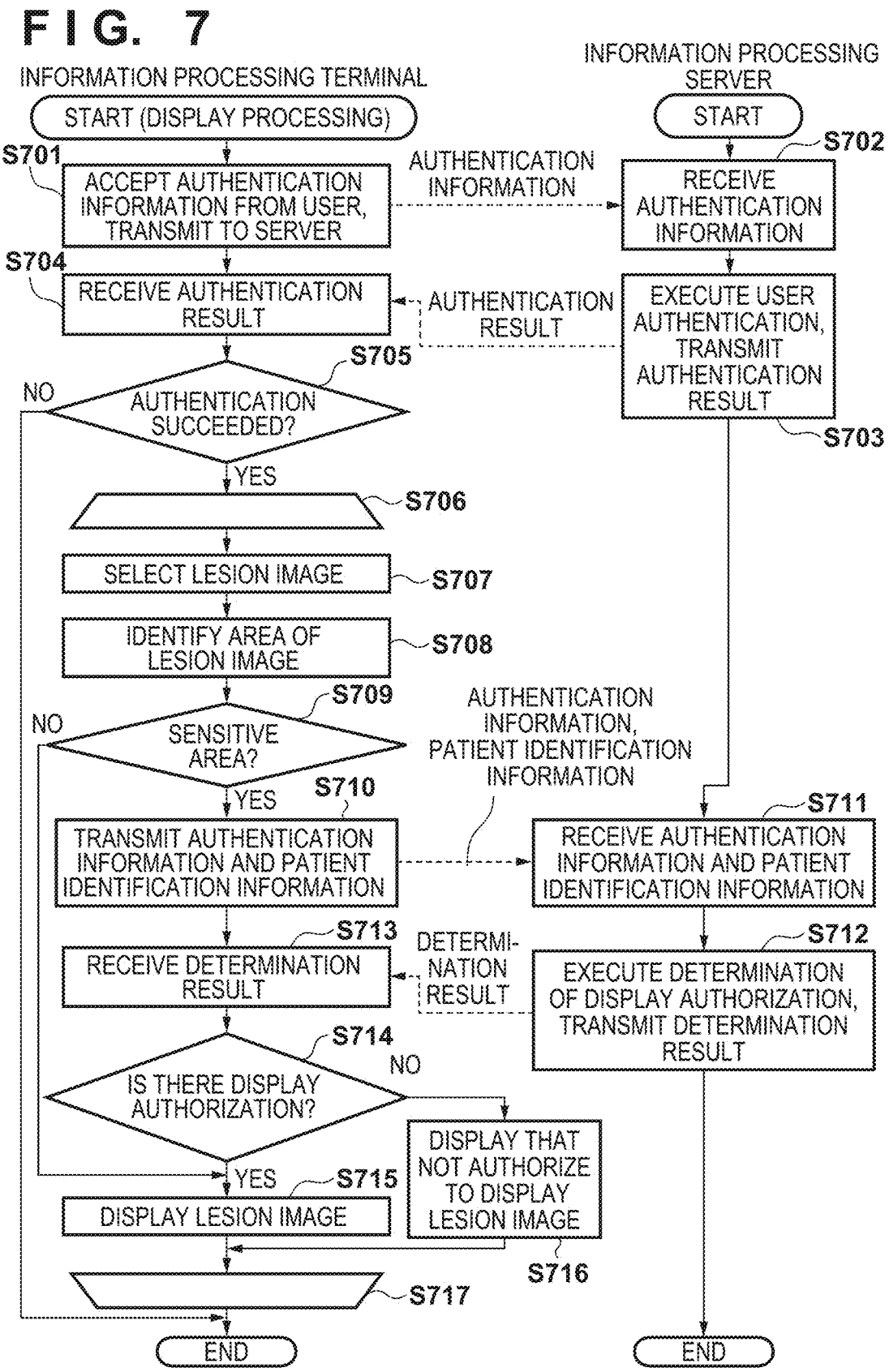
FIG. 7 is a flowchart of processing that is executed by the information processing terminal 103 and the information processing server 102 when the information processing terminal 103 displays a lesion image.

FIG. 7 is a flowchart of processing that is executed by the information processing terminal 103 and the information processing server 102 when the information processing terminal 103 displays a lesion image. The processing that is explained to be executed by the information processing terminal 103 in the description of the present flowchart can be realized by the CPU 182 executing the program stored in the ROM 183, unless specifically stated otherwise. Furthermore, the processing that is explained to be executed by the information processing server 102 in the description of the present flowchart can be realized by the CPU 152 executing the program stored in the ROM 153, unless specifically stated otherwise.

Note that in FIG. 7, the information processing terminal 103 is used as an example of an image display apparatus that displays a lesion image. However, the image display apparatus of the present embodiment is not limited to the information processing terminal 103. For example, the image capturing apparatus 101 may be used as the image display apparatus. In this case, the image capturing apparatus 101 acting as the image display apparatus executes processing similar to the processing that is executed by the information processing terminal 103 acting as the image display apparatus as described below, as long as this is technically possible. Also, according to the description of FIGS. 6A to 6C, it is assumed that the information processing terminal 103 has the functions of the electronic medical record client, and a lesion image is displayed on a screen of the electronic medical record client. However, the location of display of a lesion image according to the present embodiment is not limited to a screen of the electronic medical record client. Therefore, for example, the image capturing apparatus 101 acting as the image display apparatus that does not have the functions of the electronic medical record client may execute processing similar to the processing that is executed by the information processing terminal 103 acting as the image display apparatus as described below, thereby displaying the screens shown in FIG. 2D to FIG. 2G and the like on the display unit 115.

In step S701, the information processing terminal 103 accepts authentication information input by the user by displaying the login screen shown in FIG. 6A on the display unit 181, and transmits the accepted authentication information to the information processing server 102. Note that as stated earlier, examples of the information that can be used as the authentication information are as described in the first embodiment with reference to step S326. Furthermore, similarly to the first embodiment, the information processing terminal 103 may realize multifactor authentication by accepting a plurality of pieces of information.

In step S702, the information processing server 102 receives the authentication information from the information processing terminal 103.

In step S703, the information processing server 102 performs user authentication (determines whether the user has login authorization) based on the authentication information, and transmits the authentication result to the information processing terminal 103.

In step S704, the information processing terminal 103 receives the authentication result from the information processing server 102.

In step S705, the information processing terminal 103 determines whether the authentication result indicates that the user authentication has succeeded (whether the user has login authorization). In a case where the user authentication has succeeded, processing proceeds to step S706; otherwise, processing of the present flowchart is ended.

In steps S706 to S717, the information processing terminal 103 executes processing for displaying a lesion image registered with the electronic medical record server. The lesion image is recorded in the storage 156 of the information processing server 102 that has the functions of the electronic medical record server, and the information processing terminal 103 receives the lesion image from the information processing server 102 and displays the lesion image. In general, a plurality of lesion images are recorded in the electronic medical record; thus, processing of steps S706 to S717 is a loop.

In step S707, the information processing terminal 103 selects a lesion image to be displayed on the display unit 181 based on, for example, a medical record display instruction, a patient selection instruction, an appointment date selection instruction, or a scroll instruction that has been input by the user using the input unit 187.

In step S708, the information processing terminal 103 identifies an area of the lesion image selected in step S707. Various identification methods described in the first embodiment and the second embodiment can be used as the method of identifying an area.

In step S709, the information processing terminal 103 determines whether the area identified in step S708 is a sensitive area. In the case of the sensitive area, processing proceeds to step S710; otherwise, processing proceeds to step S715.

In steps S710 to S714, processing for determining whether the user has authorization to display a sensitive area is executed. The following describes an exemplary configuration in which the information processing terminal 103 transmits information necessary for making the determination about display authorization to the information processing server 102, receives a determination result from the information processing server 102, and refers to the determination result, thereby determining whether the user has authorization to display a sensitive area. However, the present embodiment is not limited to this configuration. For example, the information processing terminal 103 may conclude the processing for making the determination about display authorization inside the information processing terminal 103 without communicating with the information processing server 102, similarly to the description of steps S327 to S331 in the first embodiment. In this regard, the same goes for processing for user authentication in steps S701 to S705; the information processing terminal 103 may conclude the processing of user authentication inside the information processing terminal 103 without communicating with the information processing server 102.

In step S710, in order to confirm whether the user has authorization to display the lesion image, the information processing terminal 103 transmits the authentication information of the user accepted in step S701, as well as the patient identification information of the patient that has been referred to through the electronic medical record client, to the information processing server 102 via the interface 185. Note that in a case where a method that does not use the patient identification information of the patient is used as the method of making the determination about display authorization, transmission of the patient identification information in step S710 is not necessary. Similarly to the first embodiment, it is sufficient for the information processing terminal 103 to transmit necessary information to the information processing server 102 in accordance with the method of making the determination about display authorization.

In step S711, the information processing server 102 receives the authentication information of the user and the patient identification information.

In step S712, the information processing server 102 determines whether the user has authorization to display a patient image based on the authentication information of the user and the patient identification information, and transmits the determination result to the information processing terminal 103. As stated earlier, various methods can be used as the method of making the determination about display authorization (a determination criterion), similarly to the first embodiment. Examples of the method of making the determination about display authorization (the determination criterion) are as described in the first embodiment with reference to step S329. Note that the third embodiment adopts a configuration that determines whether a user who has succeeded in user authentication has the display authorization. Therefore, among the examples of the determination method (determination criterion) described in the first embodiment, the criterion where every authenticated user has the display authorization is excluded in the third embodiment.

In step S713, the information processing terminal 103 receives the determination result.

In step S714, the information processing terminal 103 determines whether there is display authorization (whether the user has the display authorization) based on the determination result received in step S713. In a case where there is display authorization, processing proceeds to step S715; in a case where there is no display authorization, processing proceeds to step S716.

In step S715, the information processing terminal 103 displays the lesion image as shown in FIGS. 6A to 6C under reference sign 602, for example.

In step S716, the information processing terminal 103 presents a display indicating that there is no authorization to display the lesion image as shown in FIGS. 6A to 6C under reference sign 603, for example.

Step S717 is the end of the loop. In a case where the user has performed an operation to finish viewing of the medical record on the information processing terminal 103, the information processing terminal 103 ends processing of the present flowchart. Otherwise, processing returns to step S706.

As described above, the third embodiment can suppress the possibility that a lesion image including a sensitive area will be viewed unnecessarily, similarly to the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-170864, filed Sep. 29, 2023, which is hereby incorporated by reference herein in its entirety.

What is claimed is:

1. An image display apparatus comprising at least one processor and/or at least one circuit which functions as:
   an acceptance unit configured to accept authentication information from a user,
   a selection unit configured to select an image;
   a first determination unit configured to determine whether the image includes a specific area of a person;
   a second determination unit configured to determine whether the user has display authorization with respect to the specific area based on the authentication information; and
   a control unit configured to, in a case where it has been determined that the image includes the specific area, control display of the image in accordance with the authentication information, wherein
   the control unit performs control to display the image in a case where it has been determined that the user has the display authorization, and
   in a case where it has been determined that the image includes the specific area, when a display size of the image is smaller than a predetermined size, the control unit performs control to display the image regardless of whether the user has the display authorization.

2. The image display apparatus according to claim 1, wherein
   the first determination unit determines whether the image includes the specific area based on whether an area indicated by area information associated with the image is the specific area.

3. The image display apparatus according to claim 1, wherein
   the first determination unit transmits person identification information for identifying the person to an external apparatus, receives area information associated with the person from the external apparatus, and determines whether the image includes the specific area based on whether an area indicated by the area information is the specific area.

4. The image display apparatus according to claim 3, wherein
   in a case where the area information indicates a plurality of areas, the first determination unit determines that the image includes the specific area if at least one of the plurality of areas is the specific area.

5. The image display apparatus according to claim 1, wherein
   the first determination unit infers an area included in the image using artificial intelligence, and determines whether the image includes the specific area based on whether the inferred area is the specific area.

6. The image display apparatus according to claim 5, wherein
   in a case where the inference of the area included in the image has failed, the first determination unit determines that the image includes the specific area.

7. The image display apparatus according to claim 1, wherein
   the specific area includes at least one of an area that allows the person to be identified as a specific individual, and an area concerning a dignity of the person.

8. The image display apparatus according to claim 1, wherein
   the specific area varies in accordance with an attribute of the person.

9. The image display apparatus according to claim 1, wherein
   the second determination unit determines whether the user has the display authorization by transmitting the authentication information to an external apparatus and receiving a result of determination about whether the user has the display authorization from the external apparatus, the determination being made based on the authentication information.

10. The image display apparatus according to claim 1, wherein
   the second determination unit determines that the user has the display authorization in a case where user authentication based on the authentication information has succeeded.

11. The image display apparatus according to claim 1, wherein the authentication information includes user identification information for identifying the user, and the second determination unit determines whether the user has the display authorization with respect to the specific area based on the authentication information and person identification information for identifying the person.

12. The image display apparatus according to claim 11, wherein the second determination unit determines whether the user has the display authorization by transmitting the authentication information and the person identification information to an external apparatus and receiving a result of determination about whether the user has the display authorization from the external apparatus, the determination being made based on the authentication information and the person identification information.

13. The image display apparatus according to claim 1, wherein the second determination unit determines whether the user has the display authorization with respect to the specific area based on the authentication information and photographer identification information for identifying a photographer of the image.

14. The image display apparatus according to claim 13, wherein the second determination unit determines whether the user has the display authorization by transmitting the authentication information and the photographer identification information to an external apparatus and receiving a result of determination about whether the user has the display authorization from the external apparatus, the determination being made based on the authentication information and the photographer identification information.

15. The image display apparatus according to claim 1, wherein in a case where it has been determined that the image includes the specific area, when it has been determined that the user does not have the display authorization, the control unit performs control to present a display indicating that the display authorization is absent.

16. The image display apparatus according to claim 1, wherein in a case where it has been determined that the image does not include the specific area, the control unit performs control to display the image regardless of whether the user has the display authorization.

17. The image display apparatus according to claim 1, wherein after the image has been selected, the acceptance unit encourages the user to provide the authentication information, and in a case where a second image different from the image has been selected after it has been determined that the user has the display authorization with respect to the specific area, the acceptance unit refrains from encouraging the user to provide the authentication information.

18. The image display apparatus according to claim 17, wherein in a case where a predetermined condition has been satisfied after it has been determined that the user has the display authorization with respect to the specific area, the acceptance unit encourages the user to provide the authentication information after the second image has been selected.

19. An image capturing apparatus, comprising:

the image display apparatus according to claim 1; and an image sensor configured to generate the image.

20. A control method executed by an image display apparatus, comprising:

accepting authentication information from a user;

selecting an image;

determining whether the image includes a specific area of a person;

determining whether the user has display authorization with respect to the specific area based on the authentication information; and in a case where it has been determined that the image includes the specific area, controlling display of the image in accordance with the authentication information, wherein the controlling is performed to display the image in a case where it has been determined that the user has the display authorization, and in a case where it has been determined that the image includes the specific area, when a display size of the image is smaller than a predetermined size, the controlling is performed to display the image regardless of whether the user has the display authorization.

21. A non-transitory computer-readable storage medium which stores a program for causing a computer to execute a control method comprising:

accepting authentication information from a user;

selecting an image;

determining whether the image includes a specific area of a person;

determining whether the user has display authorization with respect to the specific area based on the authentication information; and in a case where it has been determined that the image includes the specific area, controlling display of the image in accordance with the authentication information, wherein the controlling is performed to display the image in a case where it has been determined that the user has the display authorization, and in a case where it has been determined that the image includes the specific area, when a display size of the image is smaller than a predetermined size, the controlling is performed to display the image regardless of whether the user has the display authorization.

* * * * *